March 13, 1934.　　　R. STEIN　　　1,951,070
THRESHING MACHINE
Filed March 30, 1931　　　4 Sheets-Sheet 1

March 13, 1934.    R. STEIN    1,951,070
THRESHING MACHINE
Filed March 30, 1931    4 Sheets-Sheet 3

Inventor
Robert Stein
Charles W. Hills
Attorney

March 13, 1934.  R. STEIN  1,951,070
THRESHING MACHINE
Filed March 30, 1931  4 Sheets-Sheet 4
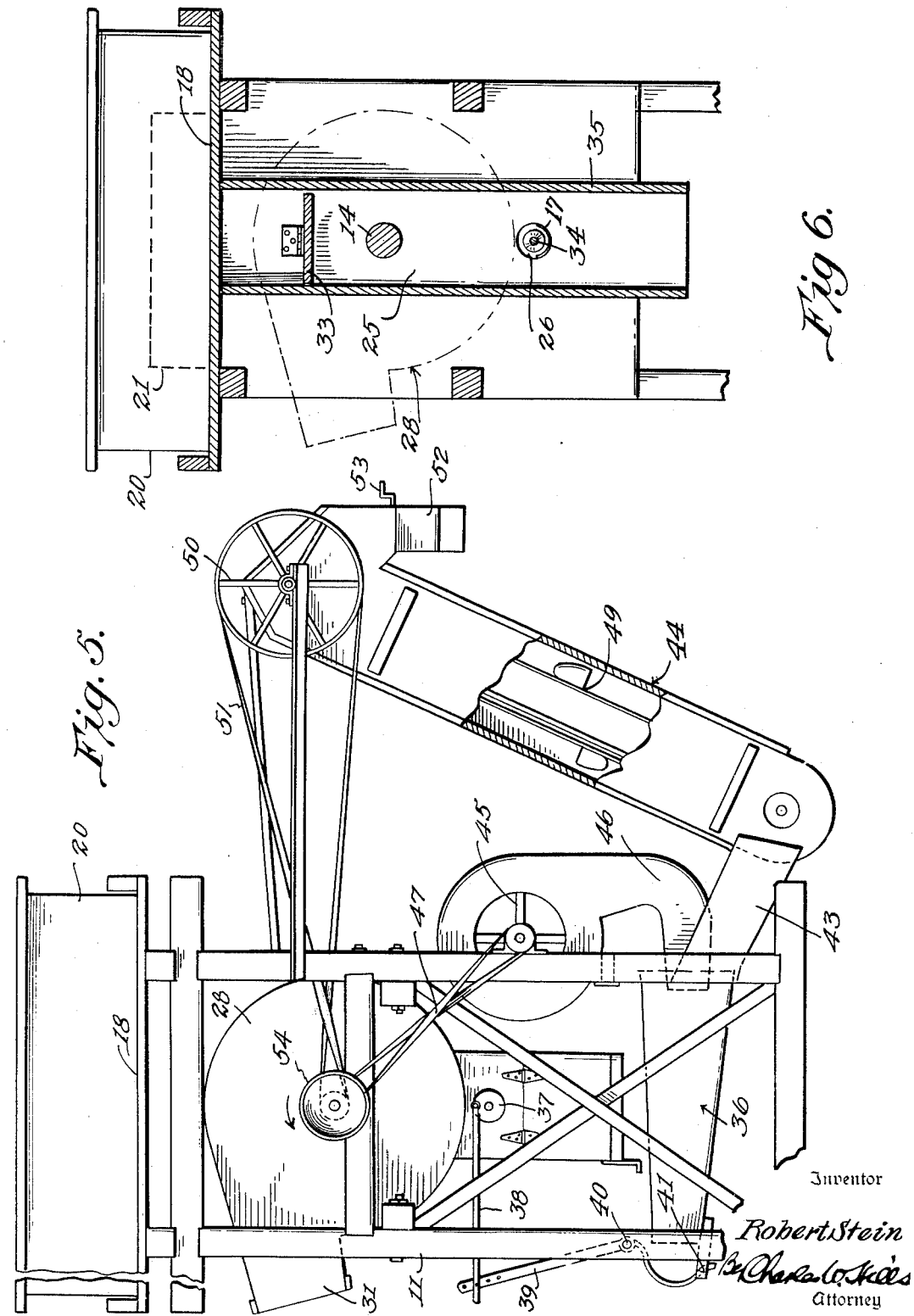
Inventor
Robert Stein
Attorney Patented Mar. 13, 1934

1,951,070

UNITED STATES PATENT OFFICE 1,951,070

THRESHING MACHINE

Robert Stein, Seguin, Tex.

Application March 30, 1931, Serial No. 526,471

2 Claims. (Cl. 130—27)

My present invention relates generally to threshing machines, and more particularly to a threshing apparatus of that type capable of handling a great variety of headed grains, such as cane, sunflower, peas, beans, kaffir corn, milo-maize and the like, and it is the primary object of my present invention to provide an apparatus of this nature which will operate efficiently and effectively in turning out whole grain with practically no waste.

It is a further object of my invention to provide a machine of this nature where means are utilized to insure the delivery of the whole grain in a clean condition without the objectionable small portions of trash so commonly present.

It is still a further object of my invention to provide a machine of the above character in which the grain to be threshed is so controlled in its movement through the machine as to insure the free delivery of threshed kernels therefrom so as to avoid waste.

Certain other and more specific objects of my invention, relating to the combination of parts thereof as well as details of certain of the parts of such combination, will more clearly appear in the course of the following description, especially by reference to the accompanying drawings, which form a part of this specification.

In the drawings:

Figure 5 is an end view in elevation looking at the forward or receiving end of the apparatus.

Figure 6 is another detail vertical transverse section taken through the apparatus in the plane of the air channel, and substantially on the line 6—6 of Figure 2.

Referring now to these figures, my invention proposes a threshing apparatus including an elongated threshing box 10, extending between, and securely mounted in elevated horizontal relation in connection with, forward and rear end frames 11 and 12. These frames have bearings 13 for the threshing shaft 14, which extends axially through the box 10.

Figure 1:
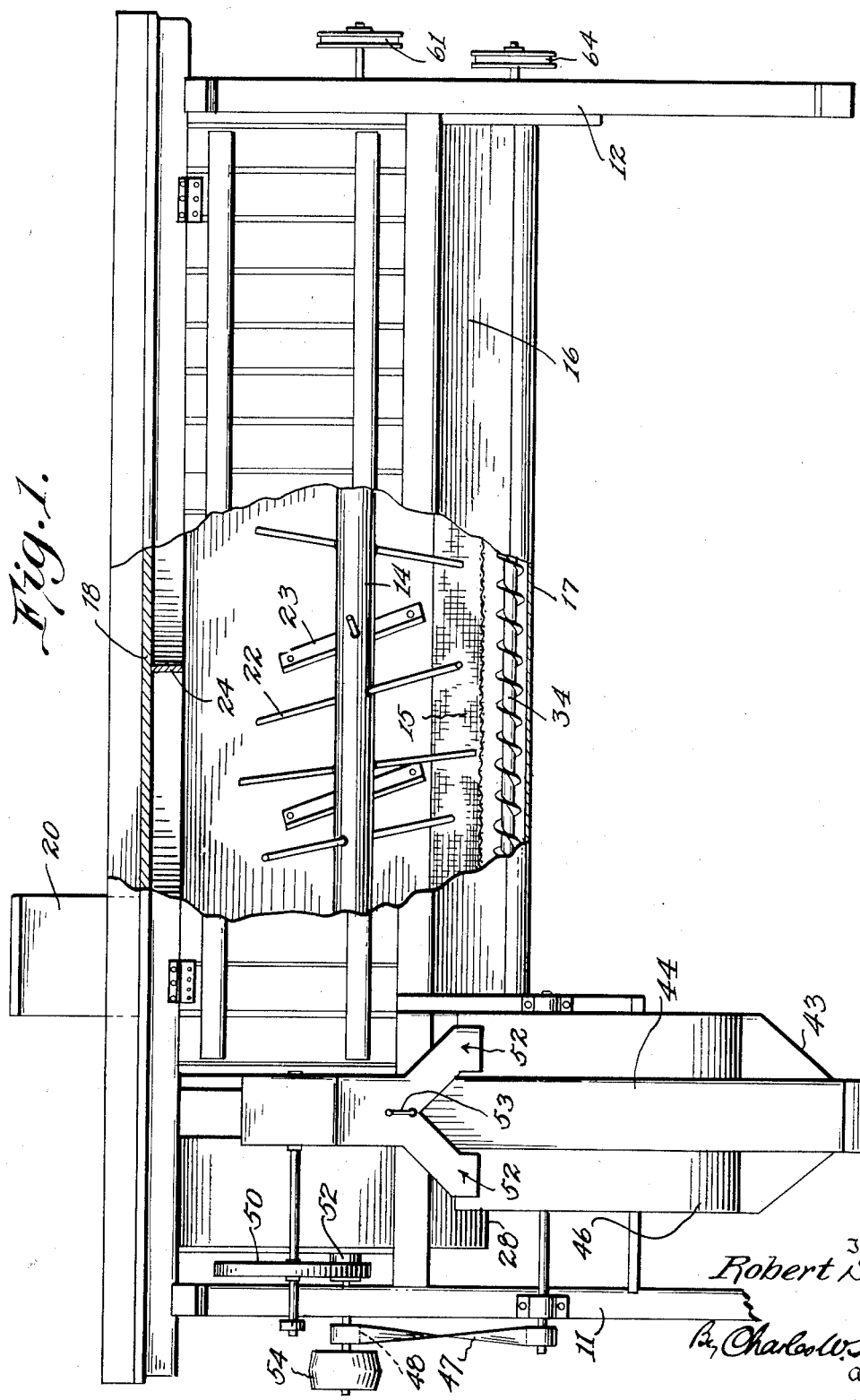
Figure 1 is a side view of my improved threshing apparatus, partly broken away and in section.
Figure 2:
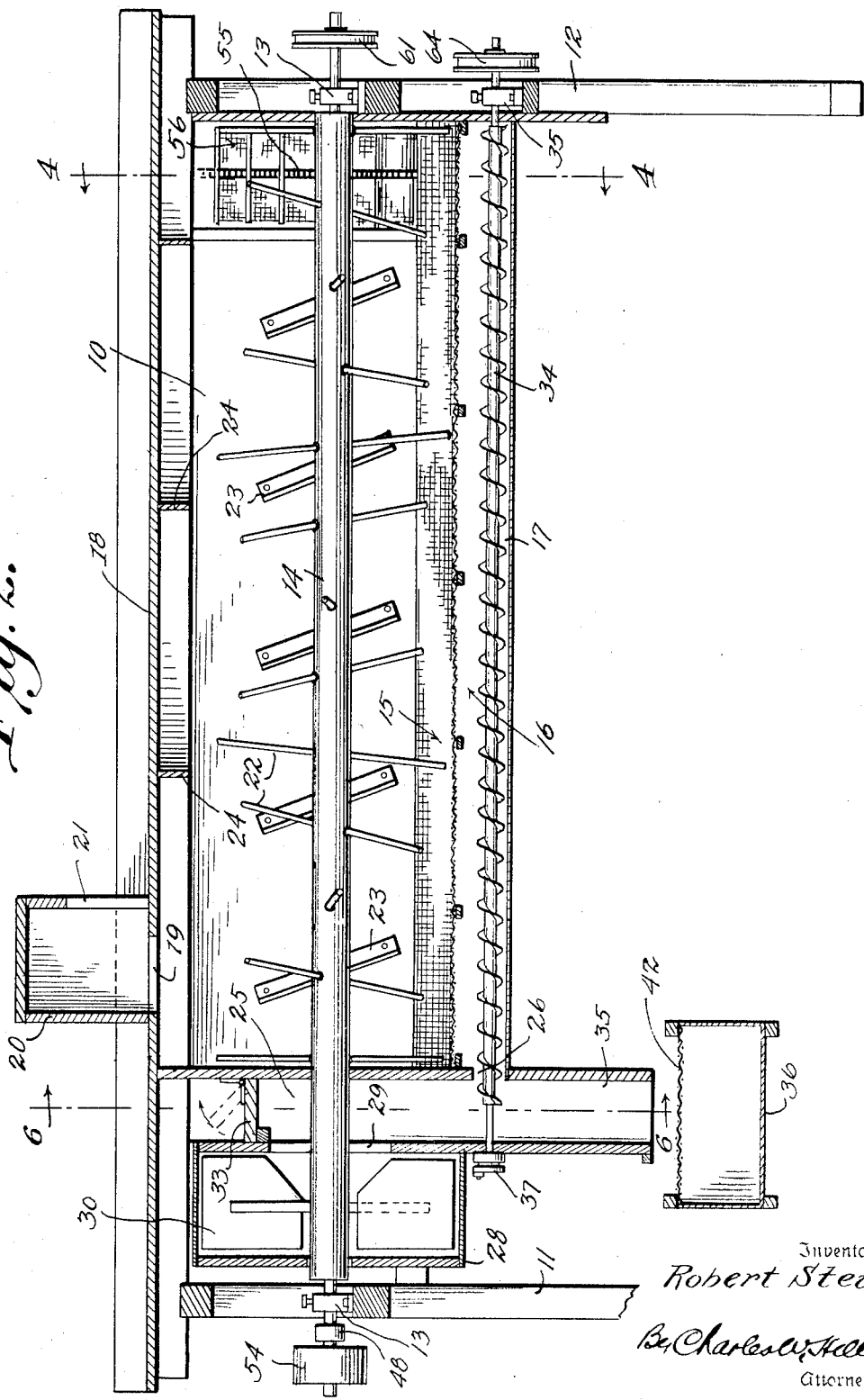
Figure 2 is a vertical section, taken centrally therethrough.
Figure 3:
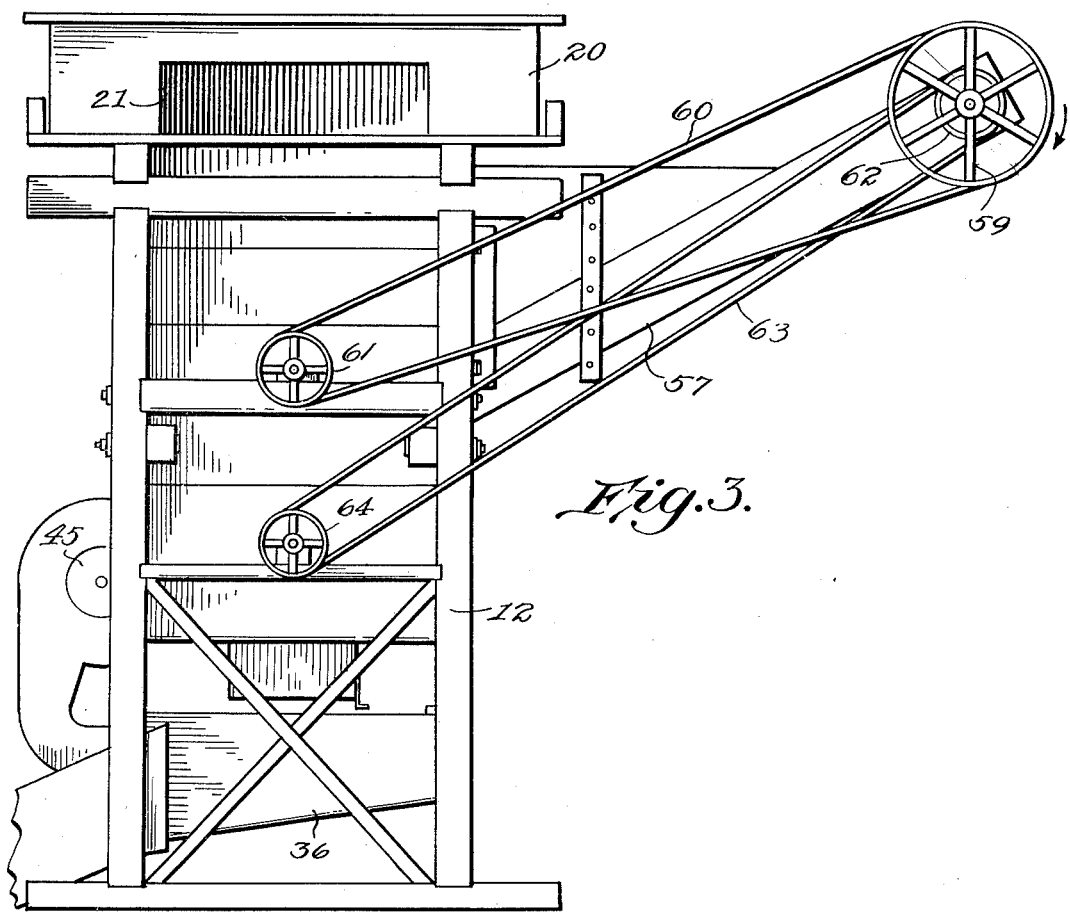
Figure 3 is an end view in elevation, looking at the rear or discharge end of the apparatus.
Figure 4:
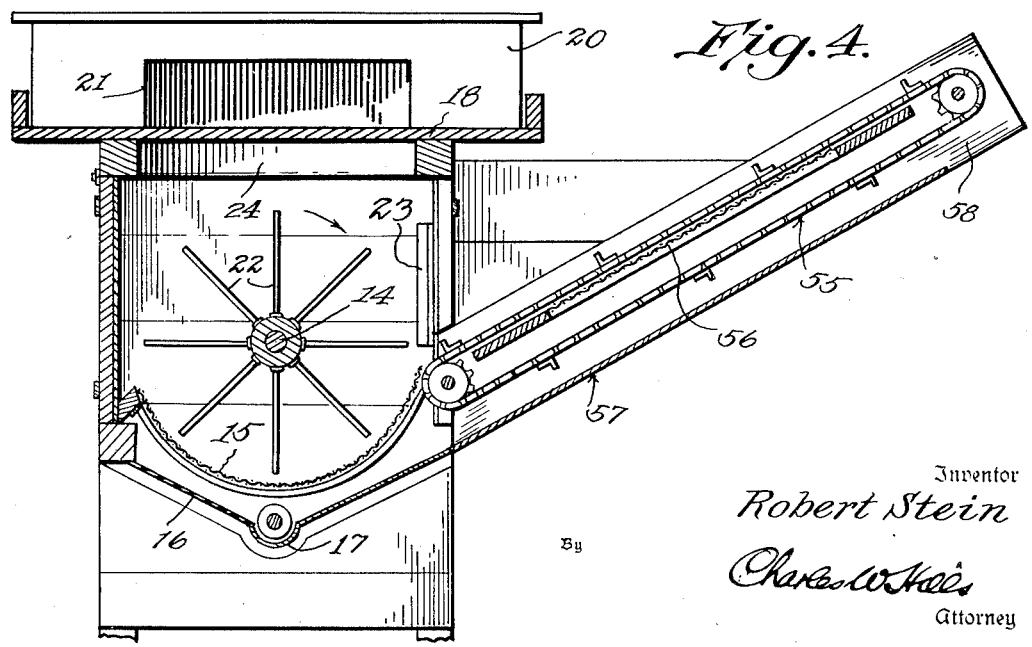
Figure 4 is a detail vertical transverse section taken through the apparatus in the plane of the trash discharge conveyer and substantially on the line 4—4 of Figure 2.

The bottom of the box is formed by a screen 15 through which the kernels of grain are free to fall as they are threshed from the grain heads passing lengthwise through the box, the screen being transversely curved as shown particularly in Figure 4 and spaced above a bottom plate 16, whose longitudinal side portions are inclined so as to direct the falling kernels into its central longitudinal trough 17.

The top wall of the box 10 is formed by a cover frame 18 having a feed opening 19 adjacent to the forward or receiving end of the box 10 and surmounted by a feed box 20 opening at 21 toward the rear of the machine. This cover frame thus forms on its top surface a convenient feed platform upon which the headed grain may be thrown and from which said grain may be fed into the box 20 and through the feed opening 19 into the threshing box at the same rapid rate at which the machine will efficiently handle the grain.

Through the shaft 14 at spaced points lengthwise of and within the threshing box 10, threshing bars 22 are fixed at angles so that their end portions radiate from the shaft and will, in the rotation of the shaft, keep the headed grain in constant agitation above the screen 15, and at the same time feed the grain along and within the threshing box from the feed opening to the lateral straw or trash outlet at the rear or discharge end of the box. In the course of its movement along and within the threshing box 10, the headed grain is retarded by inclined ribs 23 and 24 respectively upon one of the side walls of the box and the lower surface of the cover 18. Moreover, at the receiving end of the threshing box, there is a central vertically extending air channel 25 formed within a box-like chute whose lower portion is in communication at its rear side with one end of the trough 17 through an opening 26. The upper portion of this air channel is in communication at its forward side with a fan casing 28 by virtue of an opening 29 around the shaft 14 and is thus subject to the suction of the fan 30 which discharges through a tangential outlet 31, shown best in Figure 5.

The upper end of the air channel 25 has an adjustable closure in the nature of an adjustable hinged controlling door 33 so as to thus control the effect of the suction of the fan within the lower portion of the air channel. It will be understood that this controlled door 33 may be manually adjusted and held in adjustable position by any suitable means, as for instance a nail and the like through the side wall of the air channel 25.

In this way, in addition to the retarding action of the ribs 23 and 24, the headed grain in its passage through the threshing box is continuously lifted so as to prevent the sagging of its full weight upon the screen 15 and avoid the clogging of the pores of the screen. This permits the threshed kernels knocked from the grain heads by the threshing bars 22 to fall freely through the interstices of the screen 15 onto the bottom plate 16, and finally into the trough 17.

Mounted lengthwise in the trough 17 is a helicoid conveyor 34, the rear end of the shaft of said conveyer being supported in a bearing 35 on the rear supporting frame 12, and the forward end of the shaft extending through the opening 26 in the lower portion of the forward wall of the conduit forming the air channel 25. The grain kernels are thus continuously conveyed to this conduit and fall through the lower open end 35 within the influence of the suction of the fan 30 which cleans the grain as it falls.

The forward end of the shaft of conveyor 34 has thereon a crank 37, and a connecting rod 38 from this crank, as best seen in Figure 5, is pivoted to the upper end of a lever 39 fulcrumed at 40 upon a portion of the forward supporting frame 11. The lower end of this lever is pivoted at 41 to a portion of a grain box 36 positioned below the air channel 25. Thus, the grain box 36 is continuously agitated and by reason of its sloping bottom the grain kernels, falling through its screen top 42, are shaken from its lower open end through a feed chute 43 into the lower end of a grain discharge conveyor 44.

As the grain falls into the grain box 36 any trash which has found its way thus far with the grain is retained by the screen top 42 of the box and blown from the latter by the action of a cleaning fan 45 having a curved air discharge or blast nozzle 46 directed into the lower open end of the feed box above the grain chute 43, this fan 45 being actuated by a belt 47, connecting its pulley with a small pulley 48 upon the forward portion of the threshing shaft 14.

The grain discharge conveyer 44 has therein an endless bucket elevator 49, the upper shaft of which has a pulley 50 connected by a belt 51 also to the forward portion of the threshing shaft 14. Moreover, the upper portion of the grain discharge conveyer 44 has a downwardly directed outlet, between the divergent outlet nozzles 52 of which a valve is mounted, controlled by an external handle 53 to direct the out-flowing grain into either of the nozzles 52 as desired by the operator.

Power is applied to the threshing shaft 14 from any suitable source of power belt-connected to its forward pulley 54, and it is obvious that in operation rotation of the shaft will not only thresh the grain kernels from the grain heads within the threshing box through the action of the threshing bars 22, but will also slowly force the material rearwardly within the box, retarded as the latter is by the action of the ribs 23 and 24.

During this movement of the grain, the kernels threshed therefrom fall, as before stated, through the screen 15, and the straw or thrash moves to the rear of the threshing box where it is discharged through a lateral straw or trash discharge opening, onto an endless upwardly and laterally inclined discharge conveyor 55, shown best in Figure 4. Beneath this conveyor a screen 56 is mounted capable of permitting loose kernels to fall to the inclined base 57 of the frame 58 of the conveyor. The lower end of the said frame base 57 joins the rear portion of one side of the bottom plate 16 of the threshing box so that any kernels thus falling during the discharge of the trash will find their way into the feed trough 17 along with the grain kernels falling through the screen 15.

The discharge conveyor 55 is actuated by a pulley 59 at its outer end, connected by a belt 60 to a pulley 61 upon the rear end of the threshing shaft 14. Moreover, the upper shaft of the conveyor 55 on which the pulley 59 is mounted is also provided with a second pulley 62 connected by a belt 63 to a pulley 64 upon the rear end of the screw conveyor shaft 34.

It is thus to be seen that the power applied to the threshing shaft 14 is distributed through the connections previously described so as to bring about proper concerted action of the trash discharge conveyor 55, the grain discharge elevator, the screw conveyor shaft 34, and the grain cleaning fan 45, which the suction fan 30, being mounted directly upon the threshing shaft, needs no other connections.

It will also be obvious that in the operation of the machine, the suction from the fan 30 is effective to initially clean the grain as it falls in the lower portion of the conduit which forms the air channel 25, said lower portion of this conduit being utilized as a portion of the grain discharge channel into which the conveyor 34 continually forces the threshed kernels during the operation of the machine. The grain, after cleaning while it is falling through the air channel, is then recleaned in the shaker box 36 where it passes through the screen top 42 within the influence of the blower or cleaning fan 45. The machine thus does a double duty of cleaning and thoroughly cleans the grain without loss or breakage.

In this way, and by the combined action of the above parts, I am not only enabled to handle a great variety of headed grains, but am enabled to insure effective and efficient discharge of whole grains in a clean state with little, if any, waste.

What is claimed is:

1. A threshing machine comprising an elongated threshing box having closed front and rear ends and having a top inlet for headed grain adjacent its front end and a lateral outlet for the straw and trash adjacent its rear end, means for threshing the headed grain and for feeding it from the inlet to the outlet, means positioned below said feeding means for feeding the threshed kernels toward the front end of the box in a direction opposite to that of the headed grain, conveyor means connected to the rear end of said box to convey and sift straw or chaff and to return kernels to said kernel feeding means, a discharge conduit for said kernel feeding means, a kernel shaker screen in the path of the discharged kernels, a blower fan to blow air through said shaker screen, and a suction fan in communication with said kernel discharge conduit adapted to receive the discharge from said blower fan and to remove dust from said kernel conveyor means and from said kernel discharge conduit.

2. A threshing machine comprising an elongated rectangular threshing box having closed front and rear ends, said box having parallel hinged side walls and being provided with a flat top wall adapted to provide a runway for headed grain, a top inlet for headed grain adjacent the front end of said box, and a lateral outlet for trash and straw adjacent the rear end of said box, means for threshing the headed grain and for feeding it from the inlet to the outlet, said means comprising a rotatable shaft mounted extending longitudinally in said box, threshing bars arranged to feed the headed grain towards the rear end of the said box, and angularly and rearwardly directed outstanding baffle members mounted in the parallel sides of said box, a screen forming the bottom of said threshing box, means defining a trough positioned below said screen, screw conveyor means in said trough adapted to convey kernels toward the front end of the box and in a direction opposite to that of the movement of the headed grain, and a suction fan mounted adjacent the inlet end of said box and externally thereof, a discharge conduit for the kernels fed by the screw conveyor, and conduit means connecting said suction fan to said discharge conduit and to said threshing box whereby said fan is adapted to remove dust from said discharge conduit and said box.

ROBERT STEIN.